United States Patent [19]

Hsieh et al.

[11] Patent Number: 4,844,933
[45] Date of Patent: Jul. 4, 1989

[54] PROCESS FOR STERILIZATION OF SPICES AND LEAFY HERBS

[75] Inventors: Ron C. Hsieh, Lutherville, Md.; Steven M. Johnson, Glen Rock, Pa.; Daniel H. Dudek, Cockeysville, Md.

[73] Assignee: McCormick & Company, Inc., Hunt Valley, Md.

[21] Appl. No.: 925,052

[22] Filed: Oct. 30, 1986

[51] Int. Cl.[4] ............................................. A23L 3/16
[52] U.S. Cl. ................................. 426/521; 426/511; 426/638
[58] Field of Search ............... 426/461, 521, 507, 510, 426/511, 524, 638

[56] References Cited

U.S. PATENT DOCUMENTS

| Re. 31,513 | 1/1984 | Glen | 426/521 |
|---|---|---|---|
| 1,061,443 | 5/1913 | Blosser | 422/26 |
| 2,163,628 | 6/1939 | Pilkey | 426/507 |
| 3,436,170 | 4/1969 | Lodge | 99/472 |
| 3,741,563 | 6/1973 | Stenstrom | 99/470 |
| 3,911,156 | 10/1975 | Swanson | 426/523 |
| 3,966,980 | 6/1976 | McGuckian | 426/393 |
| 4,057,391 | 11/1977 | Yamaguchi | 99/483 |
| 4,062,646 | 12/1977 | Lodige et al. | 426/521 |
| 4,111,654 | 9/1978 | Fahlvik et al. | 422/26 |
| 4,254,152 | 3/1981 | Janovtchik | 426/511 |
| 4,255,459 | 3/1981 | Glen | 426/521 |
| 4,361,589 | 11/1982 | Wauters et al. | 426/640 |
| 4,543,263 | 9/1985 | Goldhahn | 426/511 |
| 4,636,395 | 1/1987 | Robinson, Jr. et al. | 426/521 |
| 4,660,468 | 4/1987 | Goldhahn | 99/470 |

FOREIGN PATENT DOCUMENTS

| 1128809 | 8/1982 | Canada . |
| 1574817 | 7/1969 | European Pat. Off. . |
| 0006369 | 1/1980 | European Pat. Off. . |
| 887518 | 11/1943 | France . |
| 940097 | 12/1948 | France . |
| 980077 | 5/1951 | France . |
| 1370360 | 7/1964 | France . |
| 2014429 | 8/1979 | United Kingdom . |

Primary Examiner—George Yeung
Attorney, Agent, or Firm—Cushman, Darby & Cushman

[57] ABSTRACT

To avoid loss of volatile oils or cause change of color or excessive loss of moisture in raw vegetable product such as herbs or spices, the product is sterilized for human consumption by placing the product in a jacketed container where the temperature of the interior of walls of the container is elevated to approximately the sterilizing temperature, the product is then charged to the interior of the container and sterilizing, culinary steam is injected for up to five minutes; thereafter, the product is cooled and then the container pressurized to eject the cooled product for subsequent handling such as packaging; the apparatus includes two connected vessels, the first vessel being utilized to sterilize the product and the second vessel being utilized to cool and dry the product; transfer between the two vessels of the container system is effected by maintaining a pressure differential therebetween.

13 Claims, 2 Drawing Sheets

PROCESS FOR STERILIZATION OF SPICES AND LEAFY HERBS

BACKGROUND AND SUMMARY OF THE INVENTION

The present invention relates to a process and apparatus for sterilizing raw vegetable products and, more specifically, for sterilizing dry herbs as well as spices to render them suitable for human consumption.

In the past, sterilization of agricultural food products of the type that are packaged and placed on shelves without any significant cooking or preservatives added has depended on the use of chemicals to kill bacteria that have accumulated and grown on or near the surface of the vegetable matter. Other processes have resorted to the use of more conventional steam treatments. The difficulty with the former of these practices is that the chemicals used have often left a residue that is undesirable or may in fact be environmentally hazardous when disposed of. One such chemical that has been widely employed is ethylene oxide but which has been suspected of being harmful at some concentrations. On the other hand, the steam processes have often resulted in significant losses in terms of the flavor of the product being treated or unacceptable changes in the appearance such as the color of a food product or in the moisture content thereof. Certain food products such as leafy herbs and certain spices are particularly susceptible to damage when subjected to the steam sterilizing processes of the prior art such as that disclosed in U.S. Pat. No. 1,061,443, granted May 13, 1913. In other processes, such as that represented by U.S. Pat. No. 4,255,459 of Mar. 10, 1981, the food product is treated at such high temperatures over extended periods, that there is little possibility for avoiding substantial losses of the volatile oils that contribute significantly to the taste and therefore the saleability of the product.

In other arrangements, such as that disclosed in U.S. Pat. No. 4,210,678, substantial physical manipulation, such as grinding and crushing, is employed, which essentially change the nature of the product not to mention its appearance and taste so that the natural appearance and taste of the product is substantially if not entirely lost.

Apparatus for sterilization of material for human use or consumption are commercially available and can be modified to be usable in the process and system of the present invention. See, for example, U.S. Pat. 4,062,646.

Other processes have consumed considerable amount of time to complete the processing of a selected quantity of raw vegetable material, thus rendering the processes substantially uneconomical, while other processes have not resulted in sufficient reduction in bacteria counts to render the product suitable for safe human consumption. This is particularly important where the product must have a sufficiently long shelf life.

The present invention overcomes the foregoing difficulties by providing an environmentally safe yet highly economical and efficient process for handling raw vegetable material such as spices and leafy herbs without sacrificing the appearance, flavor level or control of moisture content of the herbs while providing significant enhanced microbe reduction so that the product will be suitable for packaging and storage in a retail outlet.

In a preferred embodiment, the present invention provides a sterilizing process where the raw and at least superficially cleaned vegetable product is disposed in a first preheated container. Culinary, that is substantially clean, steam without conventional additives is injected into the container while the contents are being mixed for a brief period of no more than five minutes for a selected quantity. The stirring or mixing of the contents of the container during the injection of the sterilizing steam assists in shortening this sterilization process thus avoiding undue exposure to the sterilizing steam and/or heat which can produce the harmful results in terms of reduction of the volatile oils, moisture content and adverse effects on the appearance of the product. This is particularly important in the case of leafy herbs which are to be subsequently packaged without any significant treatment for sale to the ultimate customer, either in bulk or in smaller retail sale containers. As is well known, leaf type herbs and spices, such as bay leaves, thyme, basil, marjoram, oregano, sage and parsley, are sensitive to temperature changes and moisture differences. The product may be held in the first container for a selected time before being transferred to a second container which is being maintained at a low pressure and the interior of which is cooled by a cooling jacket. When the product reaches the selected temperatures in the second container, the product is discharged therefrom under fluid pressure admitted to the second container.

The apparatus and method of the present invention will not only provide extremely close control of the operating parameters used in the sterilizing process but also will achieve high production output and high energy savings.

The foregoing and other advantages will become apparent as consideration is given to the following detailed description taken in conjunction with the accompanying drawings, in which:

DETAILED DESCRIPTION OF THE INVENTION

Figure 1:
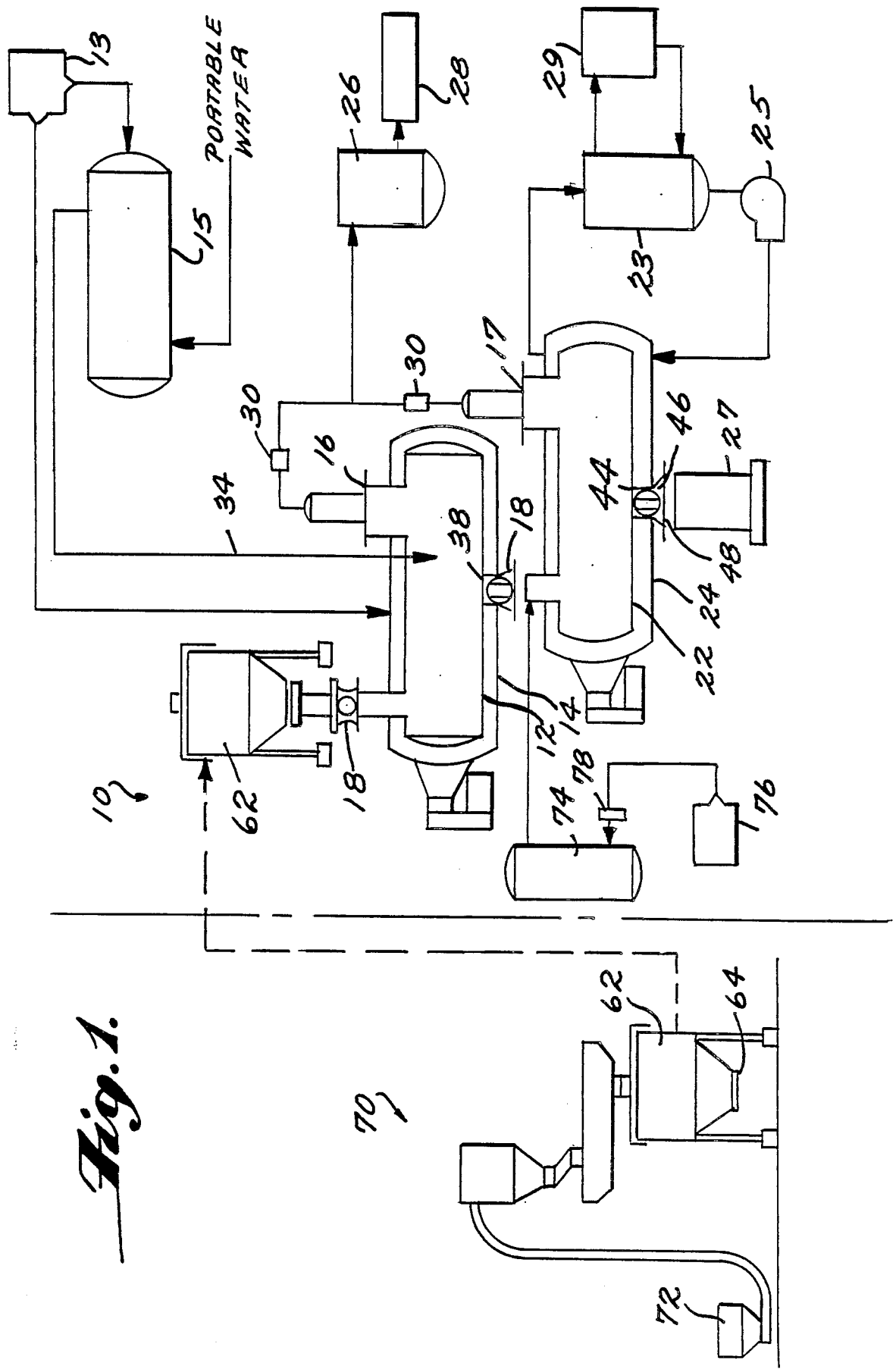
FIG. 1 is a schematic illustration of the apparatus used in carrying out the method of the present invention.

Referring now to the drawings wherein like numerals designate corresponding parts throughout the several views, there is shown in FIG. 1 the container system 10 of the present invention. In a preferred embodiment, the system will include two cylindrical vessels 12 and 22, each of which is substantially surrounded with an outer shell or jacket 14 and 24, respectively. Vessel 12 is the sterilizer vessel while vessel 22 is the cooling vessel. As described in more detail in connection with FIG. 2, each vessel is provided with an axially extending shaft which is rotatable and on which are mounted paddles for agitating and mixing the contents of each vessel. Each vessel is preferably made of stainless steel and is constructed to withstand high pressurization of the contents. Each vessel 12, 24 has its interior connected through suitable conduits to a vacuum system which may include a receiving tank 26 which, in turn, is connected to a vacuum pump 28, both of conventional construction. The valving and flow control devices and drains for the various gases and liquids that are passed through the container system 10 are well known to those skilled in this art and are omitted from the drawings for the sake of clarity. In this regard, the vacuum system will be connected to the interiors of the vessels 12 and 22 through suitable control devices and which may include program operated valves 30 which are located in conduits connected to the inlets 16 and 17 for the respective vessels 12 and 24. From the description that follows, it will be apparent to those skilled in the art that the entire sterilization process from the loading of the vegetable product into the first vessel 12 to its discharge from the second vessel 22, as well as every phase of its treatment, can be efficiently conducted by means of a computer to obtain the most efficient, qualitative and quantitative results.

The jacket 14 of the vessel 12 is connected through suitable conduits to a steam source 15 and boiler 13 and the jacket 24 of vessel 22 may also be connected to a cooling fluid source 23. The interior of the vessel 12 is also connected through conduit 34 to a culinary steam source 15. Regarding the term "culinary steam", it will be understood by those skilled in this art, that the liquid employed to generate the steam will be potable water to reduce any possibility of contaminating or altering the vegetable product being handled.

Vessel 12 has a discharge port 38 leading to a remotely controlable valve 18 which, in turn, leads to a conduit 20, the opposite end of which dumps into the interior of vessel 22. Vessel 22 is also connected through a control port 17 to the vacuum source 26 and vacuum pump 28. In addition, the jacket 24 is connected to the source of cooling fluid 23 which is connected to a conventional fluid pump 25 and a chiller 29. Port 44 of vessel 22 is also provided with a remotely controllable valve 46 leading in the discharge outlet 48 beneath which is a receptacle 27 for receiving the discharge.

Figure 2:
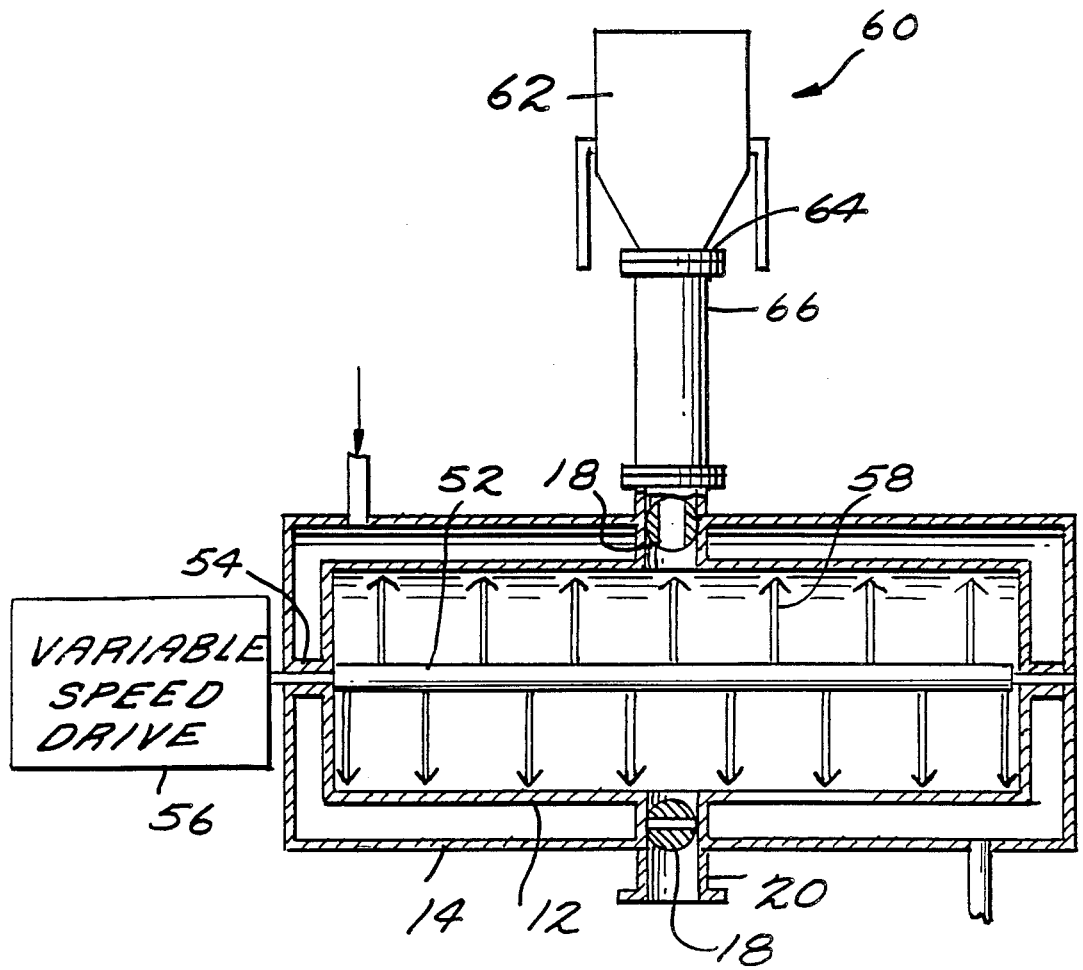
FIG. 2 is a more detailed view of one of the vessels of the container system of the present invention.

Referring now to FIG. 2, there is shown in somewhat more detail an elevational view, partly in section of the vessel 12 of the present invention which is similar to vessel 22, 24. The interior of the inner cylinder 12 is provided with an axially extending shaft 52, which is rotatably mounted by any suitable means such as sealed bearings 54. The shaft 52 is driven by a variable speed drive 56 such as a conventional electric moor. An array of paddles, one of which is indicated at 58, each being mounted to extend radially from the shaft 52 outwardly to adjacent the interior surface of the vessel 12 so that upon rotation of the shaft 52, material deposited within the vessel 12 will be continuously moved by the action of the paddles 58 into and out of engagement with the wall of the vessel 12.

Also schematically illustrated in FIG. 2, an airlock type loading arrangement 60 is provided which includes a portable hopper or tote 62 having a discharge outlet 64 which, preferably, is sealingly engageable with a flange 66 for the inlet to the vessel 12. With this arrangement, where the interior of the vessel 12 has been preconditioned for handling a specific vegetable product, the admission of the product to the interior of the vessel 12 can be effected without materially disturbing the pressure and temperature conditions set for the interior of the vessel 12. The loading valve 18 and discharge outlet 20 are each provided with remotely controllable rotary ball valves 18, of conventional construction, to facilitate rapid charging and evacuation of the interior of the vessel 12. The vessel 22 is provided with an identical discharge ball valve 46, as previously noted.

Prior to initiation of the sterilizing cycle, the hopper 62 will be loaded at a separate station indicated schematically at 70 and which may include a supply source 72 for feeding the product through cleaning and/or weighing devices to the hopper 62.

The steps of the process of the present invention utilizing the foregoing apparatus will now be described.

According to a preferred method, the walls of the first vessel 12 as well as its interior temperature are preconditioned by supplying heat to the jacket 14 preferably in the form of steam from source 15. This will prevent condensation of the sterilizing steam upon its introduction into vessel 12. In addition, a negative pressure is applied to the interior of the vessel 12 to an extent sufficient to rapidly move the charge of vegetable product, such as leafy herbs in cut or uncut form and at room or ambient temperature (about 70° F.), from the hopper 62 once the immediately subjacent ball valve 18 is opened.

With the vessel 12 preheated, as noted above, preferably so that the walls thereof are substantially at or above the temperature of the sterilizing steam originating with the boiler 13, and preferably with a vacuum existing in the second vessel 22, ball valve 18 will be opened to permit the pressure differential existing between the closed hopper 62 and the interior of the vessel 12 to pull the charge of the vegetable product into the vessel 12. Prior to the entrance of the vegetable product into the vessel 12, the paddles 58 will have been set in rotation at a predetermined rpm sufficient to effect distribution and adequate mixing of the material. Up to the present time, the lower ball valve 18 in conduit 20 will remain closed.

Once charged, the vessel 12 is then sealed by closing the valve 18 in inlet passage 16. Movement of the valve 18 in passage 16 can be employed to produce a signal to valve controls for the sterilizing steam in line 34. Sterilizing steam will then be injected for a limited amount of time, preferably from about 10 seconds up to five minutes, and at a pressure of 5 psi up to 50 psi, into the interior of the vessel 12 while the material therein is being mixed and agitated by the rotating paddles 58. The rotation of the paddles 58 during the injection of the sterilizing steam will assure substantially more even exposure of the vegetable product in the vessel 12 to the sterilizing steam, thus affording an appreciable shortening of the period during which steam must be injected into the vessel 12.

It will be appreciated by those skilled in the art that the precise temperature of the steam and length of injection thereof into the vessel 12 will depend on characteristics of the vegetable product being treated. For example, where the herb or spice being sterilized is going to be subsequently used in another cooking process, a somewhat lower effective sterilization, for bacteriocidal activity may be required, as opposed to the situation where the sterilized vegetable product is intended for packaging for an end user. Also, the reaction of various vegetable products in terms of sterilization, retention of volatile oil and appearance, will vary from one plant specie to another, so that a trial and error testing of samples of the specific material to be sterilized will be necessary. Use of the method and apparatus of the present invention, however, will permit standardization of treatment of large lots or batches of organic material originating from known sources and treated under previously known conditions.

Returning to the process, once the desired limit for sterilization has been achieved, transfer of the product to the second vessel 22 is effected. With the apparatus of the present invention, as previously noted, the interior vessel 22 will be set at a lower pressure as a result of being exposed to the vacuum system through port 17 than the pressure in vessel 12. Thus, transfer is simply effected by opening the valve 18 in the outlet passage 20, preferably while continuing rotation of the paddles 58. The interior of vessel 22 is preferably at a significantly lower temperature due to the passage of chilled water through its jacket 24 so that rapid cooling of the transfer vegetable product is effected. Of course, the valve leading to the discharge port 17 will be closed upon opening of the discharge valve 18 and conduit 20 so that pressure equalization between the two vessels will occur upon opening of the discharge valve 18 and conduit 20. Temperature sensors will of course be provided to detect the temperature in each of the jackets and the interior of each of the vessels 12 and 22. When the temperature sensor for the vessel 22 reflects that the product therein has achieved the desired temperature, the product can be discharged through valve 46 to discharge outlet 48. The operation of valve 46 may be remotely controlled by a signal derived from the temperature sensor responsive to the temperature of the product in vessel 22. Discharge is assisted with a purified compressed gas tank 74 which is supplied preferably from an inert gas source 76 through a bacterial filter 78. Nitrogen gas or filtered air is preferred at a slight positive pressure of approximately 1 psig.

With the apparatus of the present invention and the method as described above, it will be apparent that the sterilization of a batch of vegetable product can be carried out in vessel 12 while cooling and discharge of a preceding batch can be effected in vessel 22.

Due to the fact that the product is exposed for only a very brief time to high pressure and a sterilizing temperature in vessel 12 in a closed system, a large percentage of the volatile oils of herbs and spices will be retained which would be otherwise lost in a continuous open process. Further, precise control of the sterilization and transport parameters assures control of appropriate moisture levels in the product which is important to the overall appearance of the product at the end of the cycle.

Having described the invention, it will be apparent that various modifications thereto may be made without departing from the spirit and scope of this invention as defined in the appended claims.

What is claimed is:

1. The method of sterilizing raw vegetable product so as to reduce loss of volatile oils from the vegetable product comprising the steps of
preheating the interior of a closed container system of the type having jacket means to a selected temperature by introducing a heating fluid into said jacket means to effect said preheating as well as maintaining the selected temperature, loading a selected quantity of the vegetable product into the container system, continuously agitating the contents of the container system at least while the vegetable product is present in the container system, injecting sterilizing steam into the container system for a time period of from ten seconds to five minutes while continuously mixing the product in the container system with the pressure in said container system being controlled to be within the range of 5 to 50 psig to reduce the bacteria present in or on the product to an acceptable level and to retain volatile oils in the product, then cooling the product and reducing the moisture on the product in the container system, then introducing a substantially bacteria free gas and then evacuating the contents of the container system.

2. The method as claimed in claim 1 including exposing the vegetable product to dry heat for a duration no shorter than approximately ten seconds.

3. The method as claimed in claim 1 wherein the evacuation of the container system is effected with the gas at a pressure above atmospheric pressure exterior to the container system.

4. The method as claimed in claim 1 wherein the step of preheating the interior of the container system including passing steam to the jacket for a time sufficient to raise the temperature of the interior of the container system to substantially the temperature at which the sterilizing steam is injected into the interior of the container system.

5. The method as claimed in claim 1 wherein the step of introducing the gas includes introducing inert gas to raise the pressure in the container system to approximately one psig.

6. The method as claimed in claim 1 including the step of, after the step of injecting the sterilizing steam, lowering the pressure in the container system to below atmospheric to assist in cooling the product and reducing the moisture on the product and then raising the pressure in the container system by the introduction of said substantially bacteria-free gas.

7. A method of sterilizing raw vegetable product to reduce loss of volatile material from the vegetable product comprising the steps of:
preheating the interior of a closed container system to a selected temperature, loading a selected quantity of the vegetable product into the container system, injecting sterilizing steam into the container system for a time period sufficient to reduce the bacteria present in or on the product to an acceptable level, then lowering the pressure in the container system to below atmospheric while cooling the product in the container system while maintaining said container system in a closed condition isolated from the external atmosphere, then raising the pressure in the container system by introducing a substantially bacteria-free gas and then evacuating the contents of the container system:
said container system being of the type having at least two vessels for containing the product and the method including the step of feeding the product through a first one of said vessels for the preheating and sterilizing steps and maintaining pressure difference between said two vessels to assist in feeding the product through the second one of said two vessels for the remaining steps of the method, which remaining steps include the steps of conveying the product from said first vessel to said second vessel and reducing the pressure in the second vessel to below atmospheric to effect said cooling and then raising the pressure in the container system by the introduction of the said substantially bacteria-free gas and then evacuating the contents of said second vessel.

8. The method as claimed in claim 7 wherein the step of feeding the product to the second one of said two vessels includes the step of feeding the product through a closed conduit means.

9. The method as claimed in claim 7 further including the step of imposing a pressure differential between the said two vessels wherein the pressure in the second vessel is lower than the pressure in the first vessel to thereby assist in the feeding of the product from the first to the second vessel.

10. The method as claimed in claim 7 wherein the second vessel is of the type having jacket means and the method includes the step of cooling the interior of said second vessel by passing cooling fluid through said jacket means.

11. The method as claimed in claim 10 wherein said second vessel is provided with means for agitating the contents thereof and the method includes the step of agitating the product while cooling the interior of said second vessel.

12. The method as claimed in claim 12 wherein said means for agitating comprises mixing paddles mounted on shaft means rotatably mounted generally axially of said second vessel so that the paddles upon rotation of said shaft will move the product into contact with the interior wall of said second vessel.

13. A method of sterilizing raw vegetable product without substantial loss of volatile oils or substantial change of color or lowering of moisture content with the use of a container system of the type having a first vessel including jacket means and mixing means rotatably mounted on the interior of said first vessel, a second vessel including jacket means and mixing means rotatably mounted on the interior of said second vessel, conduit means connecting the interiors of said vessel with one another through valve means and means for conditioning the atmosphere in each of said vessels, comprising the steps of:

a. preheating the interior of said first vessel by passing steam through said jacket means thereof until the temperature of the interior of said first vessel is at a temperature no less than that of the sterilizing steam to be used;

b. loading a selected quantity of the product into said first vessel without significantly altering the temperature of the interior of said first vessel;

c. injecting sterilizing steam into the interior of said first vessel for a period of from ten seconds to five minutes while continuously mixing the product in said first vessel with the pressure in said first vessel being controlled to be within the range of 5 to 50 psig;

d. creating a pressure differential between said first vessel and said second vessel with the pressure in said second vessel being lower than that in said first vessel;

e. feeding said product from said first vessel through said valve means and said conduit means to said second vessel, the interior temperature of which has been lowered to approximately the final desired temperature of the product, by means of said pressure differential;

f. cooling the product in said second vessel; and g. discharging the product from said second vessel.

* * * * *